US007429170B2

(12) United States Patent
Rote et al.

(10) Patent No.: US 7,429,170 B2
(45) Date of Patent: Sep. 30, 2008

(54) METHOD AND MACHINE FOR COMPRESSION MOLDING CLOSURE SHELLS

(75) Inventors: B. Jack Rote, Sturgis, MI (US); Vance E. Reed, Columbia City, IN (US); Richard E. Zorger, Columbia City, IN (US); David C. Thompson, Grabill, IN (US)

(73) Assignee: Owens-Illinois Closure Inc., Perrysburg, OH (US)

( * ) Notice: Subject to any disclaimer, the term of this patent is extended or adjusted under 35 U.S.C. 154(b) by 238 days.

(21) Appl. No.: 11/264,946

(22) Filed: Oct. 31, 2005

(65) Prior Publication Data

US 2007/0098836 A1  May 3, 2007

(51) Int. Cl.
*B29C 43/50* (2006.01)
(52) U.S. Cl. .................. 425/350; 425/351; 425/414; 425/422; 425/438; 425/809
(58) Field of Classification Search ................. 425/350, 425/351, 414, 418, 422, 438, 809, DIG. 58; 249/59
See application file for complete search history.

(56) References Cited

U.S. PATENT DOCUMENTS

| 4,312,695 | A | 1/1982 | Willis |
| 4,867,926 | A | 9/1989 | Matsushima |
| 5,332,381 | A | 7/1994 | Shapcott |
| 5,927,567 | A | 7/1999 | Fillmore |
| 6,074,583 | A | * | 6/2000 | Ingram ........................ 425/457 |
| 6,602,065 | B1 | * | 8/2003 | Ingram ........................ 425/350 |
| 6,673,295 | B1 | | 1/2004 | Fillmore |
| 2003/0116879 | A1 | | 6/2003 | Mueller et al. |
| 2004/0036195 | A1 | | 2/2004 | Fillmore |
| 2004/0108294 | A1 | | 6/2004 | Bloom et al. |

FOREIGN PATENT DOCUMENTS

| DE | 661960 | 7/1938 |
| EP | 0903212 A2 | 3/1999 |
| JP | 06218762 | 9/1994 |

* cited by examiner

*Primary Examiner*—Yogendra N. Gupta
*Assistant Examiner*—Thu Khanh T. Nguyen
(74) *Attorney, Agent, or Firm*—Reising, Ethington, Barnes, Kisselle, P.C.

(57) ABSTRACT

A compression molding machine, for compression molding a closure shell having a base wall with an opening and in accordance with one aspect of the disclosure, includes a male mold section and a female mold section having associated surfaces that oppose each other to form a cavity for compression molding the base wall of the closure shell. An annular bead on one of these surfaces cooperates with the opposing other surface to compression mold a disk connected to the base wall by a thin frangible web. The disk and the shell are stripped separately from the mold so that the shell emerges from the machine with the opening formed in the shell base wall by removal of the disk within the machine.

36 Claims, 14 Drawing Sheets

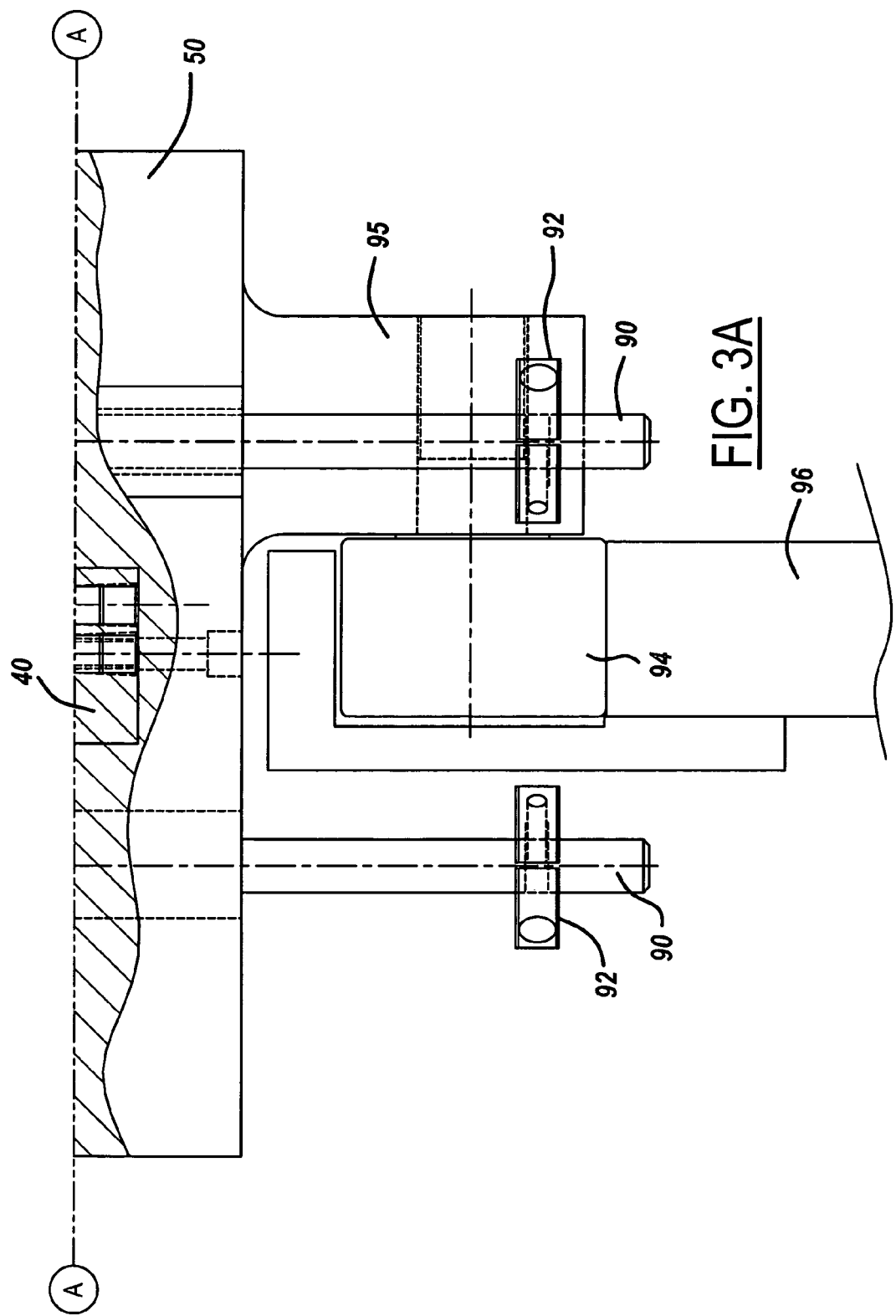

METHOD AND MACHINE FOR COMPRESSION MOLDING CLOSURE SHELLS

The present disclosure is directed to a method and a machine for compression molding closure shells having an opening in the shell base wall.

BACKGROUND AND OBJECTS OF THE INVENTIONS

Machines for compression molding closure shells typically include a turret or carousel that rotates around a vertical axis. A plurality of molds around the periphery of the carousel include male and female mold sections that are aligned along vertical axes parallel to the axis of rotation. Cams drive one or both of the mold sections of each pair between an open spaced-apart position, in which a molded part is stripped from the male mold section and a charge of plastic material is placed in the female mold section, and a closed position in which the male and female mold sections are brought together to compression mold the charge to form the shell. U.S. patents that illustrate machines of this type for compression molding plastic closure shells include U.S. Pat. Nos. 5,670,100, 5,989,007, 6,074,583 and 6,478,568.

There are applications in which it is desirable to provide an opening in the base wall of the closure shell. For example, U.S. 2004/0108294A1 discloses a plastic closure that includes a shell having a base wall with a central opening and a skirt with at least one internal thread or bead for securing the closure to a container finish. A plastic disk is retained within the shell parallel to but spaced from the closure base wall. One or more axially extending spacer elements on the disk engage the undersurface of the closure base wall and space the disk from the base wall of the shell. A resilient liner is disposed on the underside of the disk for sealing engagement with the container finish. Following application of the closure to a container finish, fluid may be directed through the opening in the closure base wall, between the disk and the undersurface of the base wall, past the spacer elements, and then between the closure skirt and the container finish to flush debris or the like from between the closure shell and the disk and finish. Another example would be a closure shell having an opening to receive a dispensing valve or the like. In compression molding closure shells of this type, the shell may be fabricated with a disk in the base wall, which is removed in a post-molding operation to provide the desired opening in the base wall of the shell. U. S. Pat. No 6,673,295 discloses a closure shell and a method of manufacture of this type. A general object of the present disclosure, in accordance with one aspect of the disclosure, is to provide a machine and a method for compression molding a closure shell having a base wall with an opening, in which the disk is removed from the closure shell within the compression mold, eliminating the need for a post-molding operation to remove the disk from the shell.

SUMMARY OF THE INVENTIONS

The present disclosure involves a number of aspects or inventions, which may be implemented separately from or in combination with each other.

A compression molding machine in accordance with a first aspect of the present disclosure, for compression molding a closure shell having a base wall with an opening, includes a male mold section and a female mold section having associated surfaces that oppose each other to form a cavity for compression molding the base wall of the closure shell. An annular bead on one of these surfaces cooperates with the opposing other surface to compression mold a disk connected to the base wall by a thin frangible web. The disk and the shell are stripped separately from the mold so that the shell emerges from the machine with the opening formed in the shell base wall by removal of the disk within the machine.

A continuous motion compression molding machine, in accordance with one presently preferred embodiment of another aspect of the disclosure, includes a wheel mounted for rotation around an axis and a plurality of angularly spaced molds disposed around the wheel. Each of the molds includes a male mold section and a female mold section aligned with each other. The mold sections have associated surfaces that oppose each other to form a cavity for compression molding the shell base wall. Each of the male mold sections includes a mold core having an end face and an annular bead on the end face of the core, a stripper sleeve surrounding the core and a stripper punch within the core. A cam is disposed adjacent to the wheel to engage the molds and move at least one of the mold sections of each mold in sequence between an open position for stripping molded shells from the cores and placing mold charges into the molds, and a closed position for compression molding the mold charges. The male and female mold sections cooperate to compression mold a disk within the bead on the core end face, which is connected to the shell base wall by a thin frangible web. The stripper sleeve and the stripper punch are movable separately from each other with respect to the core in each male mold section to strip the shell and the disk separately from the core, so that the shell emerges from the machine with the base wall opening formed by removal of the disk. The wheel may comprise a horizontal wheel as in a carousel-type compression molding machine or a vertical wheel that is rotatable around a horizontal axis.

A machine for molding a closure shell having a base wall with an opening, in accordance with a further aspect of the disclosure, includes a male mold section and a female mold section having associated surfaces that oppose each other to form a cavity for molding the closure shell base wall. The male mold section includes a core having an end forming at least a portion of the surface on the male mold section, and a bead on the surface-forming end for cooperating with the opposing surface of the female mold section to mold a disk frangibly connected to the shell base wall by a thin frangible web. The disk and the shell are separately strippable from the mold core so that the shell emerges from the machine with the disk removed and the opening formed in the base wall of the shell. A method of compression molding a closure shell having a base wall with an opening, in accordance with yet another aspect of the disclosure, includes compression molding a closure in a mold in such a way that a disk is connected by a frangible web to the base wall of the closure, and stripping the closure shell from the compression mold separately from the disk so that there is an opening in the base wall where the disk was molded. The disk may be stripped from the mold either prior to or subsequent to stripping the shell from the mold.

BRIEF DESCRIPTION OF THE DRAWINGS

The disclosure, together with additional objects, features, advantages and aspects thereof, will best be understood from the following description, the appended claims and the accompanying drawings, in which:

FIGS. 3A-3D together form a sectional view taken substantially along the line 3-3 in FIG. 2;

DETAILED DESCRIPTION OF PREFERRED EMBODIMENTS

The disclosure of above-noted U.S. 2004/0108294A1 is incorporated herein by reference.

Figure 1:
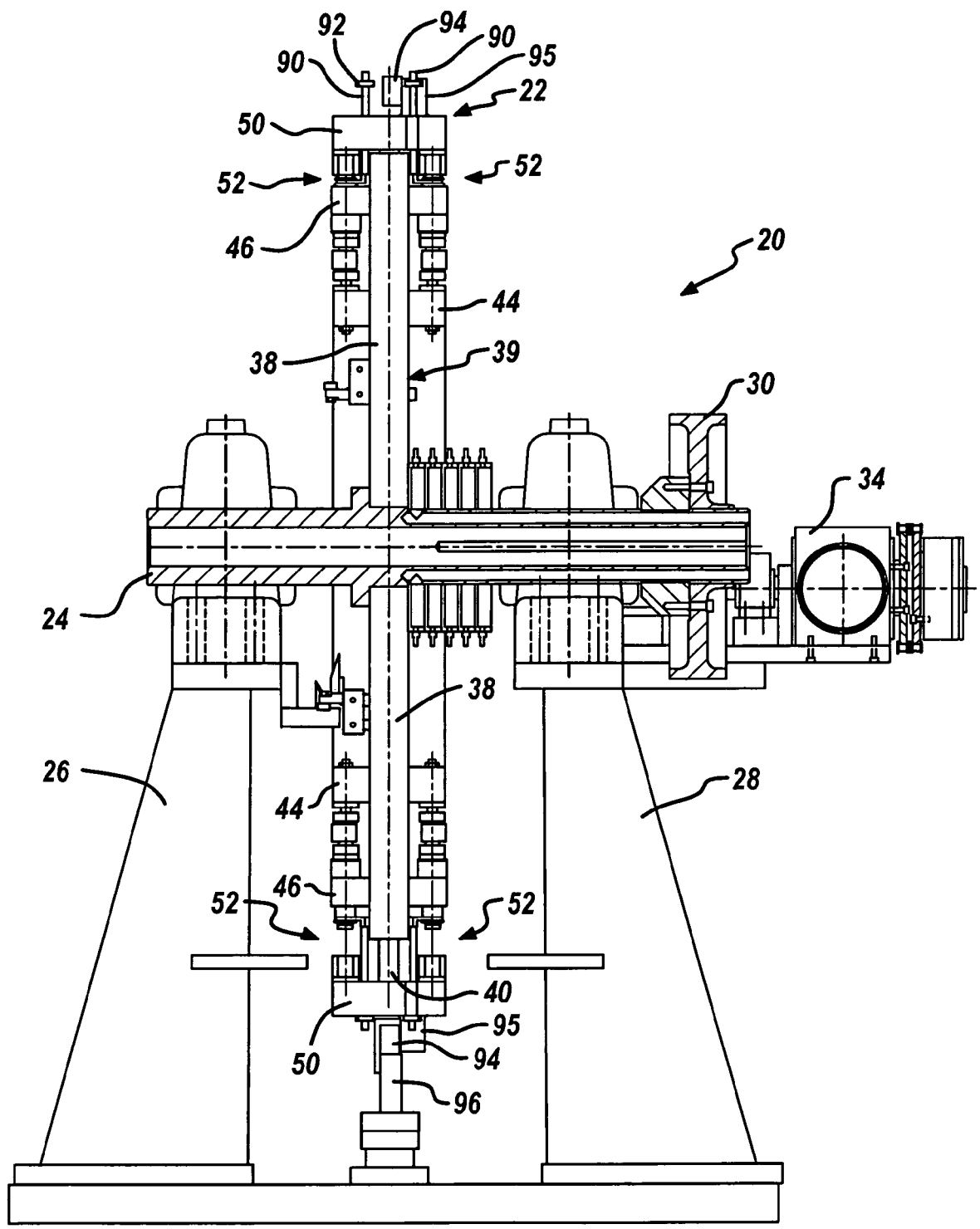
FIG. 1 is a front elevational view of a compression molding machine in accordance with one embodiment of the present disclosure.
Figure 2:
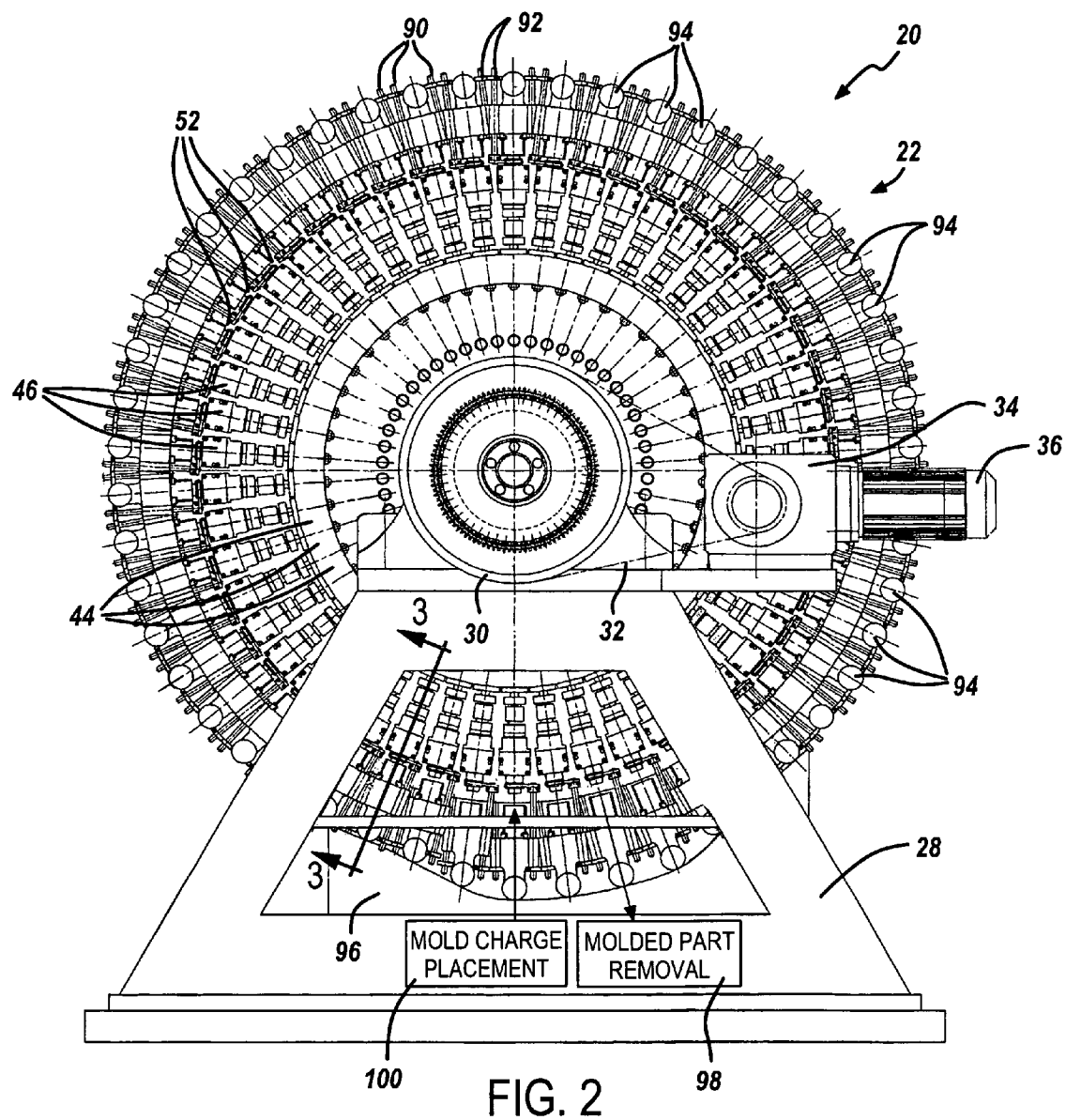
FIG. 2 is a side elevational view of the compression molding machine illustrated in FIG. 1.

FIGS. 1-2 illustrate a machine 20 for compression molding plastic closure shells in accordance with one embodiment of the disclosure. Machine 20 includes a wheel 22 mounted on a shaft 24 between spaced supports 26,28. Shaft 24 is coupled by a pulley 30, a belt 32 (FIG. 2) and a gearbox 34 to a motor 36 for rotating shaft 24 and wheel 22 around a horizontal axis. Wheel 22 includes a hub (which may be part of shaft 24) and a support 39 extending radially from the hub. Support 39 may comprise a solid disk or the like, or more preferably a plurality of angularly spaced radially extending support spokes 38. Each support spoke 38 is hollow at its outer end, as best seen in FIGS. 3A-3D. A rod 40 is slidably supported, such as by sleeve bearings 42, within the hollow outer end of each spoke 38. A crossbar 50 is coupled to the outer end of each rod 40 so that the combination of rod 40 and bar 50 is generally T-shaped as viewed from the tangential direction in FIG. 3B. A plurality of radially spaced external supports 44, 46 are provided on each axial side of each spoke 38. The radially inner supports 44 on the series of spokes preferably form circumferentially continuous support rings, as best seen in FIG. 2. Radially outer supports 46 preferably are circumstantially spaced from each other. A plurality of angularly spaced molds 52 are disposed around the periphery of wheel 22, preferably on both sides of the wheel. Each mold 52 is disposed between supports 44, 46 on an associated spoke 38 and an end of crossbar 50 on rod 40. All molds 52 preferably are identical. To the extent thus far described, machine 20 is similar to that disclosed in copending U.S. application (Docket 18565) entitled "Compression Molding Machine," the disclosure of which is incorporated herein by reference.

Each mold 52 preferably includes a radially inner first mold section or segment 54 and a second mold section or segment 56 in radially outward alignment with the associated first mold section 54. In the preferred embodiments of the disclosure, to the extent embodied in a vertical wheel machine, the radially inner first mold section 54 is a male mold section and the radially outer second mold section 56 is a female mold section, although these mold sections could be reversed in accordance with the broadest principles of the disclosure. Male mold section 54 includes a mold core 58 (FIGS. 3B, 4 and 5) having a core tip 60 mounted on the end of a core sleeve 62. A stripper punch 64 is slidably carried within an opening 65 at the end of core tip 60, preferably coaxially with the core tip and the core sleeve. Punch 64 has a hollow shank 66 (FIG. 5) that extends from a head 67 into a core coolant insert 68 (FIGS. 3B and 4) mounted within core sleeve 62. An air tube 70 extends from coolant insert 68 through a core shaft 71 (FIGS. 3B and 3C) mounted on coolant insert 68 within core sleeve 62, and then to a manifold 72 carried by core shaft 71. Manifold 72 in this embodiment has an inlet fitting 74 for feeding air under pressure through tube 70 to a passage 76 in stripper punch 64. Passage 76 (FIG. 5) is generally T-shaped, having legs 78 at the end of punch 64 for feeding the air through the annular gap 79 between punch head 67 and the end of core tip 60.

A key 80 (FIGS. 3B and 4) extends from shank 66 of punch 64 laterally through a slot 82 (FIG. 4) in core sleeve 62 into a slot 84 in a stripper sleeve 86 that slidably surrounds core 58. Slot 84 in stripper sleeve 86 preferably is in the form of an annular internal pocket that extends entirely around the interior of the stripper sleeve. A collar 88 engages an external slot 89 in stripper sleeve 86. At least one rod 90 slidably extends from collar 88 through an opening in crossbar 50. A collar 92 (FIG. 3A) is adjustably mounted on rod 90 for engagement by crossbar 50 as female mold section 56 is drawn radially outwardly to open the mold, as will be described. One or more springs 93 (FIGS. 3B and 4) are captured in compression between key 80 and the end of core tip 60 to bias stripper plug 64 to a closed position, in which plug head 67 abuts an internal shoulder 91 (FIG. 5) of opening 65. Manifold 72 also carries coolant inlet and outlet fittings for circulating coolant through mold core 58, as described in detail in the above-referenced copending application.

A cam follower roller 94 (FIGS. 1, 2 and 3A) is rotatably mounted on a leg 95 that extends radially outwardly from crossbar 50. Leg 95 preferably is offset from the axis of rod 40 on which crossbar 50 is mounted so that cam follower roller 94 is aligned with the axis of rod 40. Each cam follower roller 94 on each crossbar 50 in the illustrated exemplary embodiment thus is associated with two molds 52 located on opposite sides of wheel 22. A cam 96 preferably is disposed along the lower arc of the periphery of wheel 22, as best seen in FIG. 2, for engaging cam follower rollers 94 in sequence as wheel 22 rotates around its horizontal axis. During clockwise rotation of wheel 22, in the orientation of FIG. 2, follower roller 94 of each mold 52 in sequence is engaged and captured by cam 96 to pull female mold sections 56 outwardly and downwardly away from male mold sections 54. When each mold in turn is fully open, closures are removed from the mold cavities by a suitable part removal mechanism 98 (FIG. 2). A new mold charge of plastic material is then placed in each mold by a suitable placement apparatus 100. As wheel 22 continues rotation, female mold segments 56 in sequence are moved upwardly and inwardly to their closed positions with respect the male mold segments by the clockwise end of cam 96, again in the orientation of FIG. 2. Molded article removal mechanism 98 and mold charge placement apparatus 100 may be of any suitable types. Hydraulic, pneumatic or electric actuators could be used on each spoke 38, instead of cam 96, to move the female mold sections radially inwardly and outwardly.

Each female mold section 56 includes a cavity-forming insert 102 (FIGS. 4 and 5) on a mounting block 104 carried by crossbar 50. Flow of coolant from crossbar 50 to and from block 104 and insert 102 preferably is as described in the above-referenced copending application. A mold pin 106 is mounted on block 104 and biased through an opening 107 in insert 102, toward male mold section 54, by a spring 108 captured in compression between pin 106 and the opposing surface of crossbar 50. Pin 106 has an end face 110 that preferably is substantially flat. The opposing end face 112 of core tip 60 has an annular bead 114. Bead 114 has anannular internal undercut best seen in FIG. 5 and surrounds a plateau 116 that is raised with respect to end face 112 of core tip 60. Bead 114 aligns and preferably is coaxial with core pin 106 on female mold section 56. Pin 106 is movable to accommodate small variations in mold charge pellets. A bubbler 107 (FIGS. 3B, 4 and 6) provides cooling to pin 106.

In operation, with mold sections 54, 56 separated from each other, a mold charge of suitable plastic material is placed within the mold, such as by being placed within mold cavity insert 102 in the embodiment of FIGS. 3A-5. As the mold segments thereafter are closed, the mold charge is compression molded between male mold section 54 and female mold section 56. Bead 114 squeezes the plastic material against surface 110 of pin 106 to form a thin frangible annular web 117 (FIG. 5) between the disk 118 formed against plateau 116 and the base wall 119 of the closure. Base wall 119 is annular and integrally connected to disk 118 by frangible web 117. Base wall 119 (as well as web 117 and disk 118) is compression molded between the opposing surfaces of pin 106 and insert 102 in female mold section 56, and core tip 60, core sleeve 62 and stripper punch 64 on male mold section 54. Plateau 116 preferably is offset from the surrounding annular surface 112 of core tip 60 to reduce the amount of material in disk 118. The outer surface of punch head 67 preferably is coplanar with plateau 116 in the closed position of the mold.

When the mold sections thereafter are opened with respect to each other, such as by outward motion of female mold section 56 in the illustrated embodiment of the disclosure, engagement of crossbar 50 with collar 92 on rod 90 (FIG. 3A) pulls collar 88 and stripper sleeve 86, which is engaged with the axial edge of the skirt 121 (FIG. 5) of the molded closure shell. Stripper sleeve 86 thus strips the closure shell (128 in FIG. 7) off of mold core 58. In the meantime, disk 118 at the center of the closure shell is held within annular bead 114, so that frangible web 117 that connects the disk to the shell ruptures, leaving the disk on the mold core while the shell is stripped from the mold core. Continued motion of stripper sleeve 86 eventually brings the end of slot 84 into engagement with key 80, so that further motion of the stripper sleeve also moves key 80 and core punch 66 with respect to core tip 60 and core sleeve 62. This motion of punch 66 strips disk 118 from within bead 114 for recycling or disposal. The lost motion between stripper sleeve 60 and stripper punch 64, effectuated in this embodiment by key 80 and slot 84, ensures that the closure shell is stripped from the mold core prior to stripping the disk from the mold core. The shell thus emerges from the mold with the center opening formed in shell base wall 119. As stripper punch 64 is moved outwardly in this embodiment, air under pressure preferably is fed through fitting 74 and manifold 72 (FIG. 3C), air tube 70 (FIGS. 3B, 3C and 4), passages 76, 78 in punch 64 (FIGS. 4 and 5) and gap 79 (FIG. 5) to assist stripping of disk 118 from within bead 114.

FIGS. 6-8, 9, 10 and 11 illustrate respective additional embodiments of the present disclosure. In each of these figures, components that are the same as or similar to those illustrated in FIGS. 1-5 are indicated by correspondingly identical reference numerals.

Figure 3B:
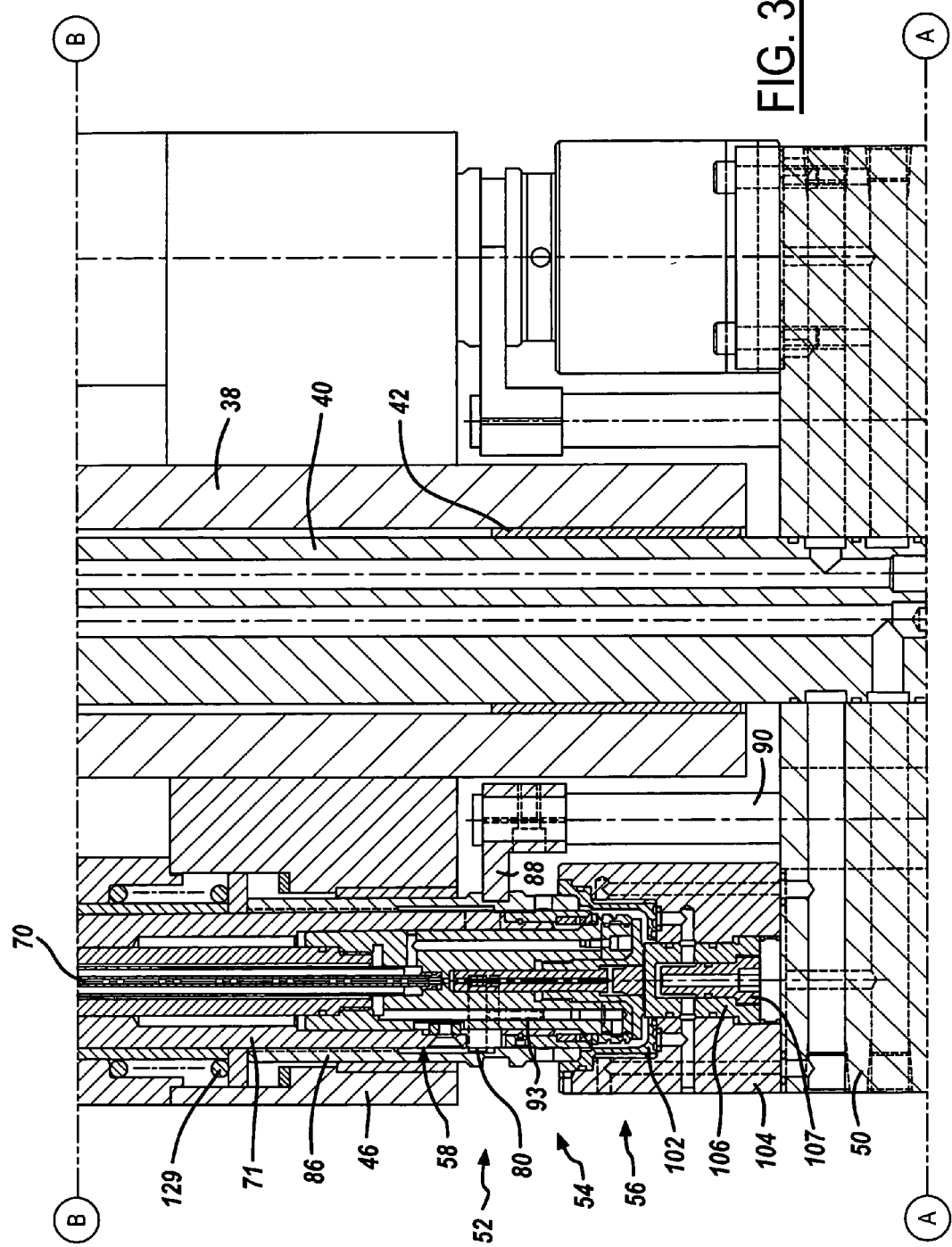
Figure 3C:
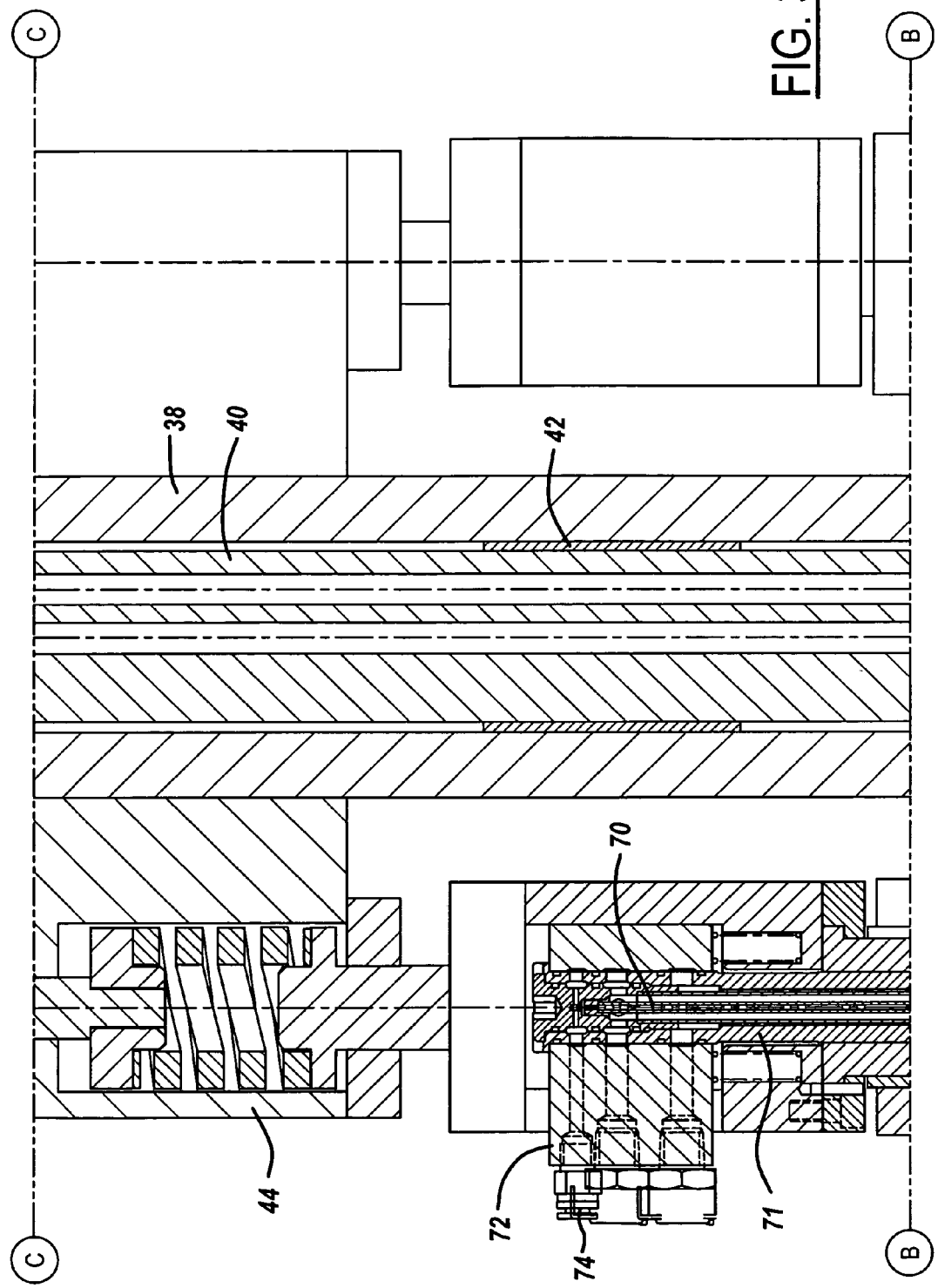
Figure 3D:
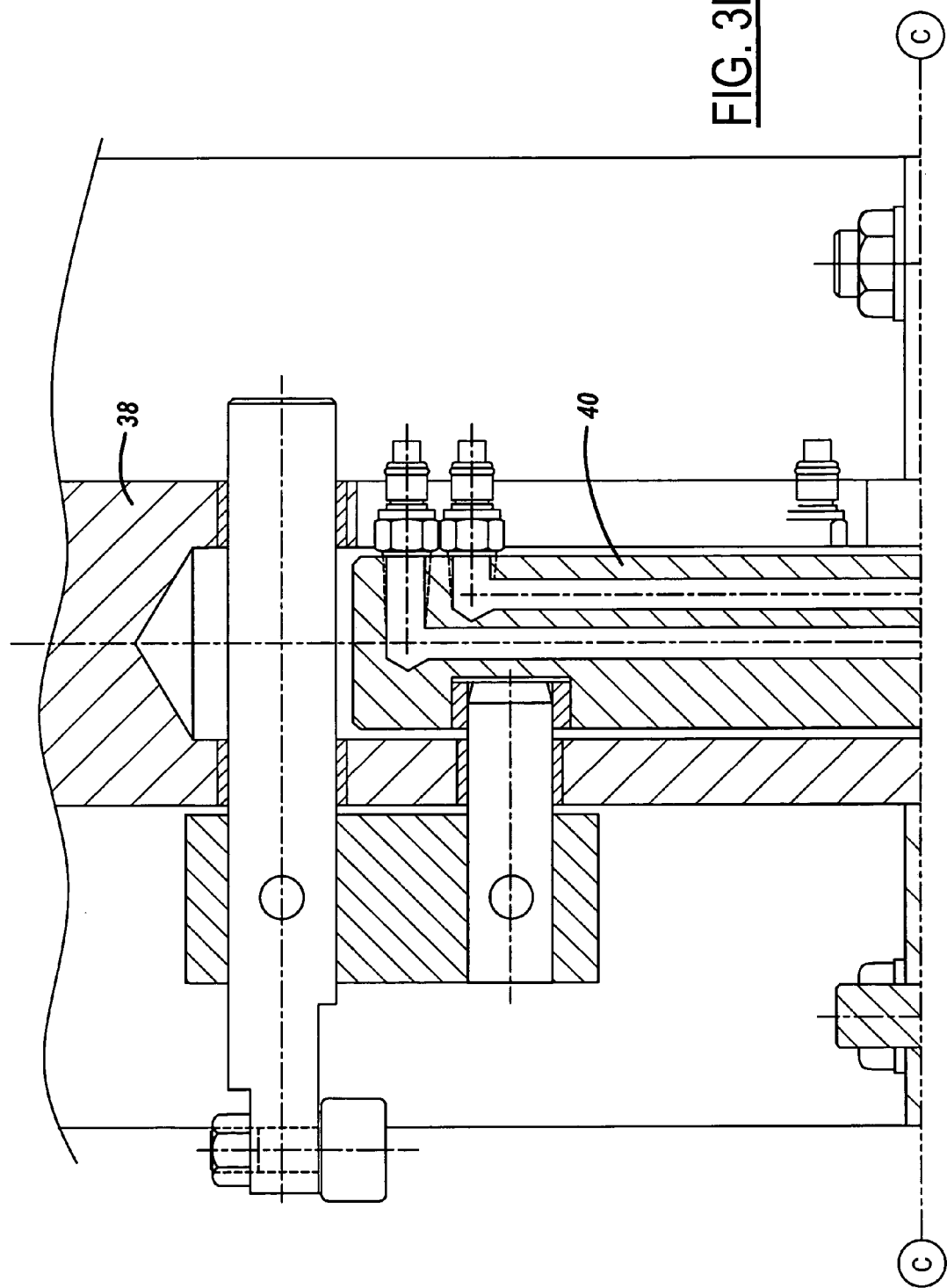
Figure 4:
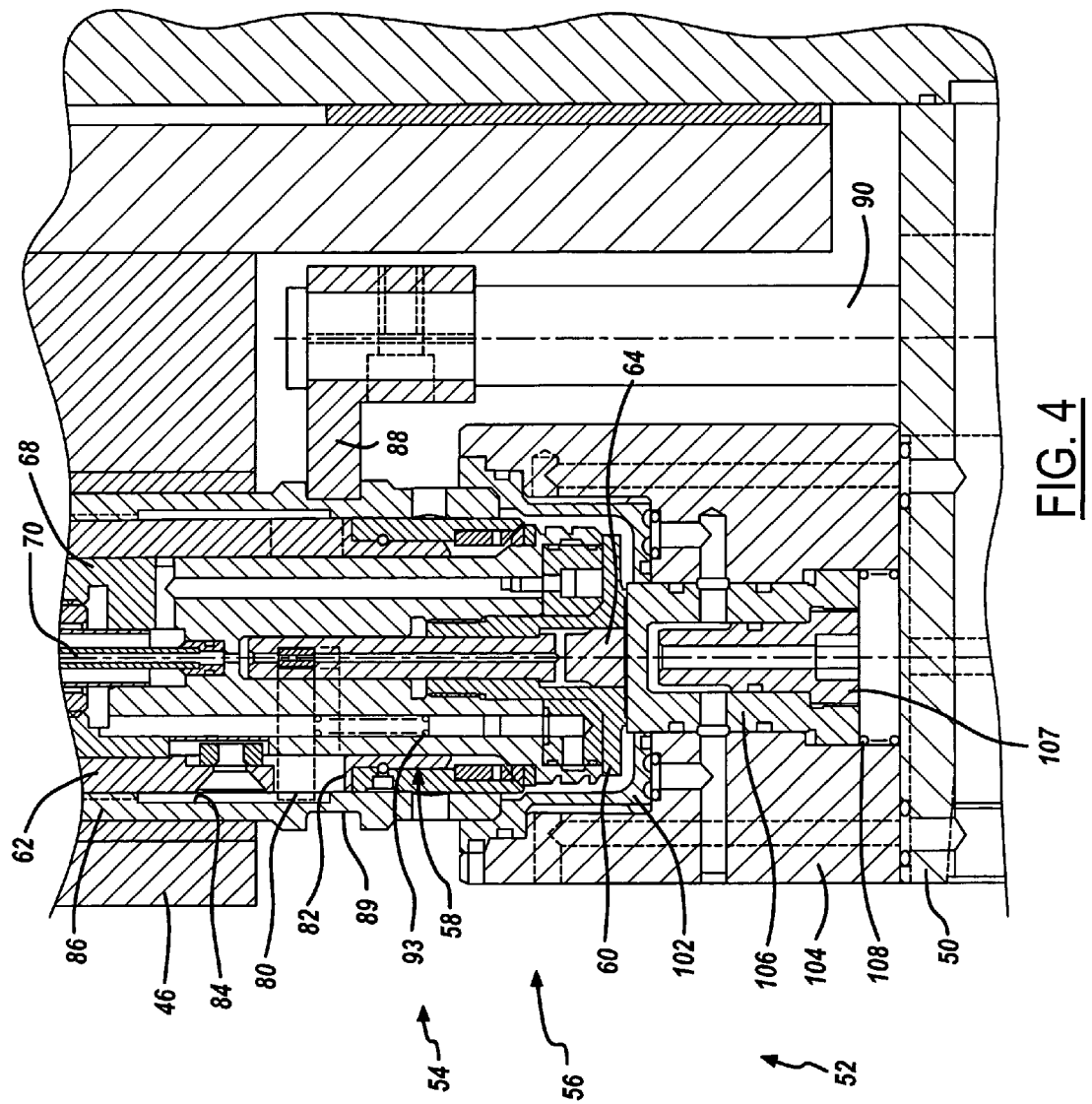
FIG. 4 is an enlargement of a portion of FIG. 3B.
Figure 5:
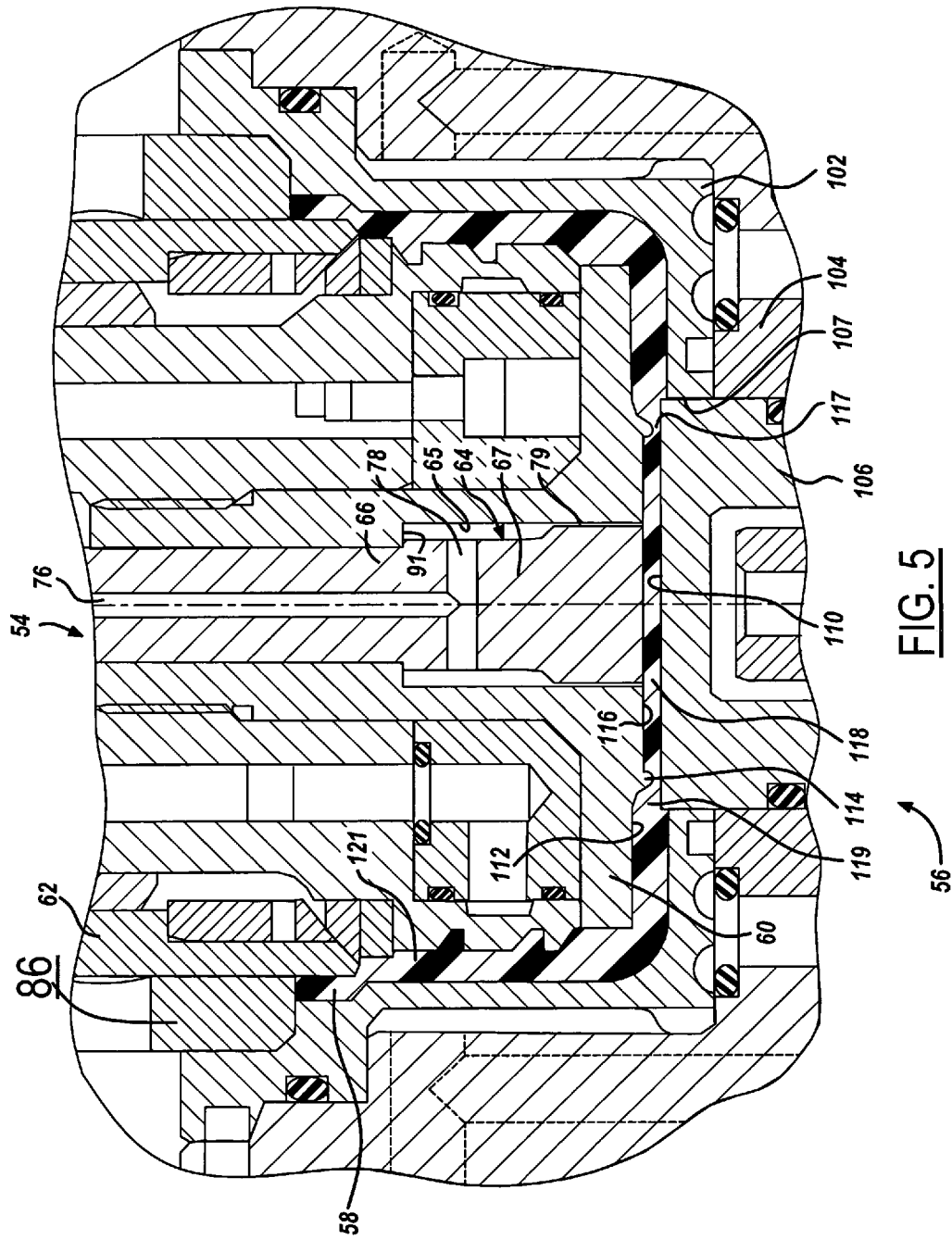
FIG. 5 is an enlargement of a portion of FIG. 4.
Figure 6:
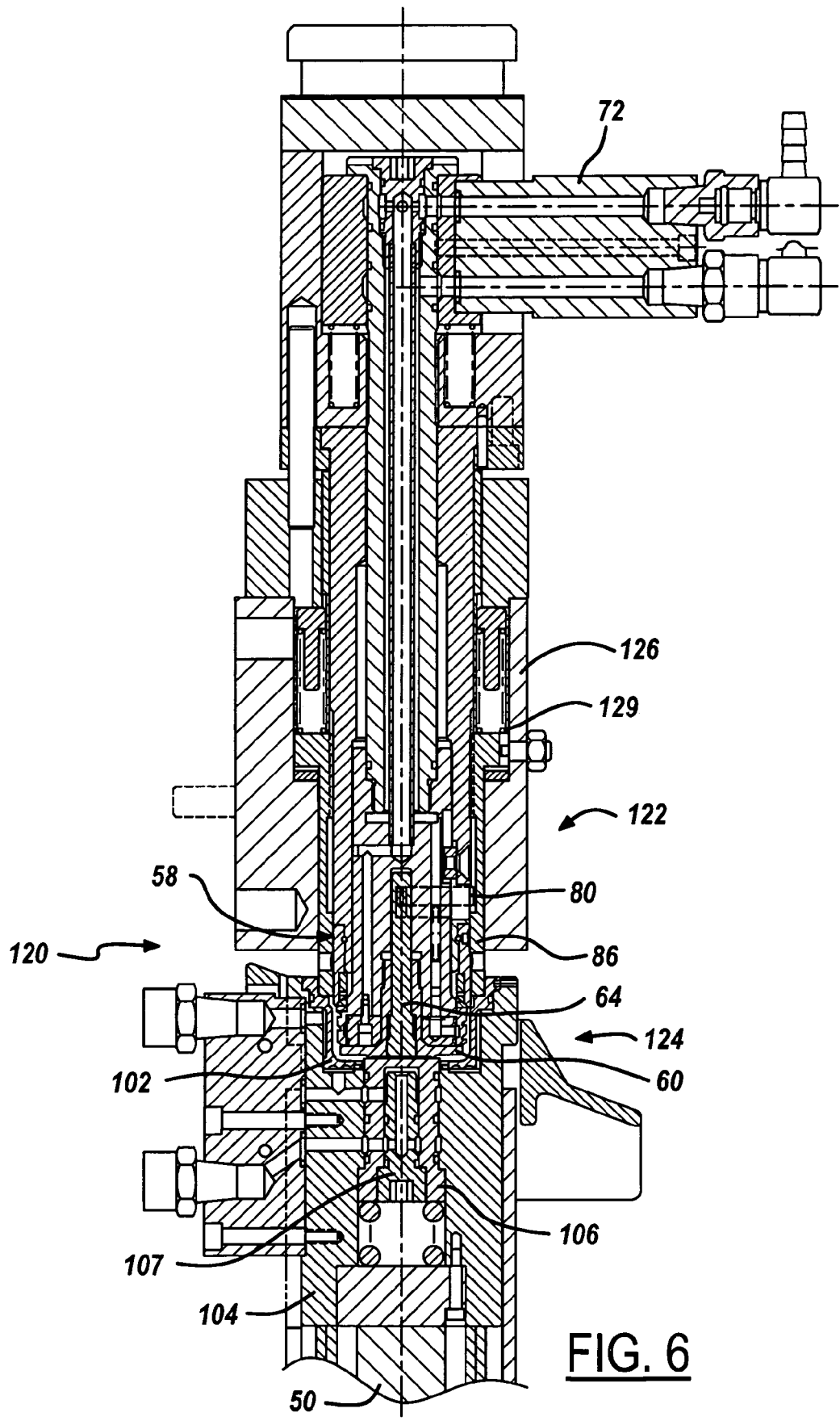
FIGS. 6-8 are fragmentary sectional views that illustrate another embodiment of the present disclosure.
Figure 7:
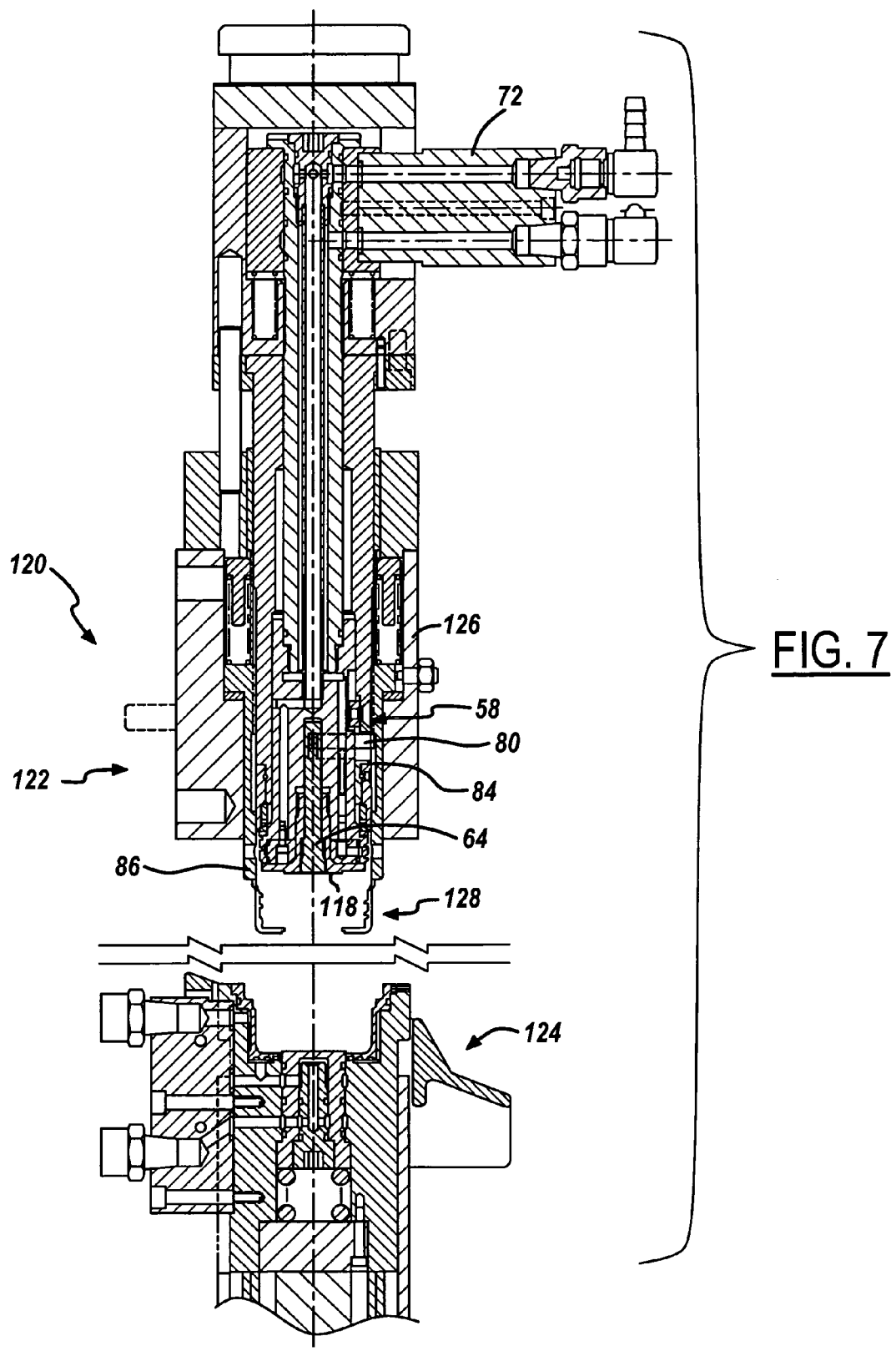
Figure 8:
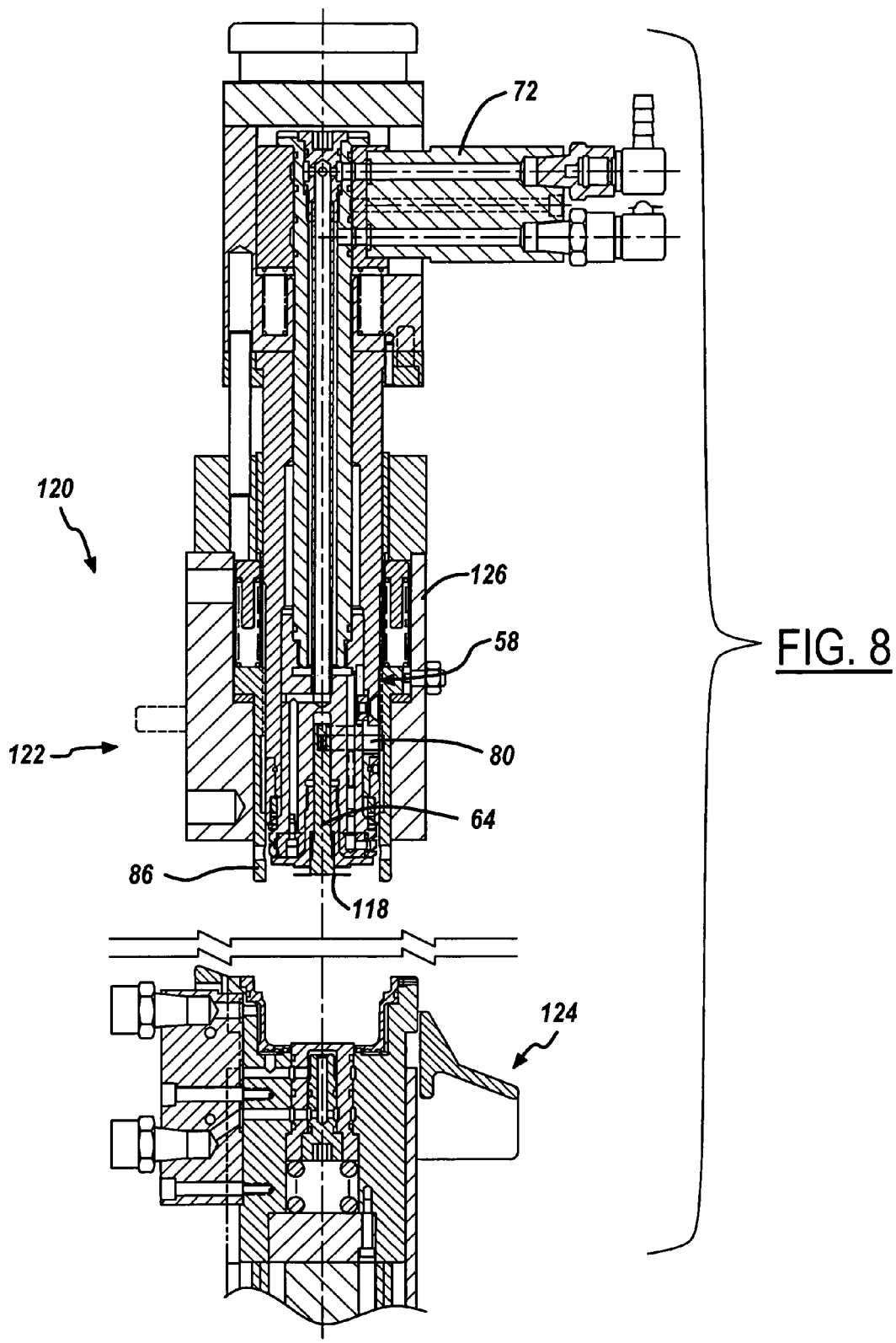

FIGS. 6-8 illustrate a mold 120 that includes a male mold section 122 and a female mold section 124. One difference between mold 120 in FIGS. 6-8 and mold 52 in FIGS. 3A-5 is the absence of an air tube 70 (FIGS. 3B-3C and 4) for assisting stripping of disk 118 from the end of core tip 60. Furthermore, in this embodiment, stripper sleeve 86 is mounted on a holder 126 that is held stationary while mold core 58 is retracted to strip the closure shell 128 (FIG. 7). One or more springs 129 bias stripper sleeve 86 to close off the mold cavity. (Similar springs 129 are shown in FIG. 3B.) Lost motion between key 80 and sleeve 86 due to slot 84 activates stripper punch 64 only after the closure shell has been fully stripped (FIG. 8E).

Figure 9:
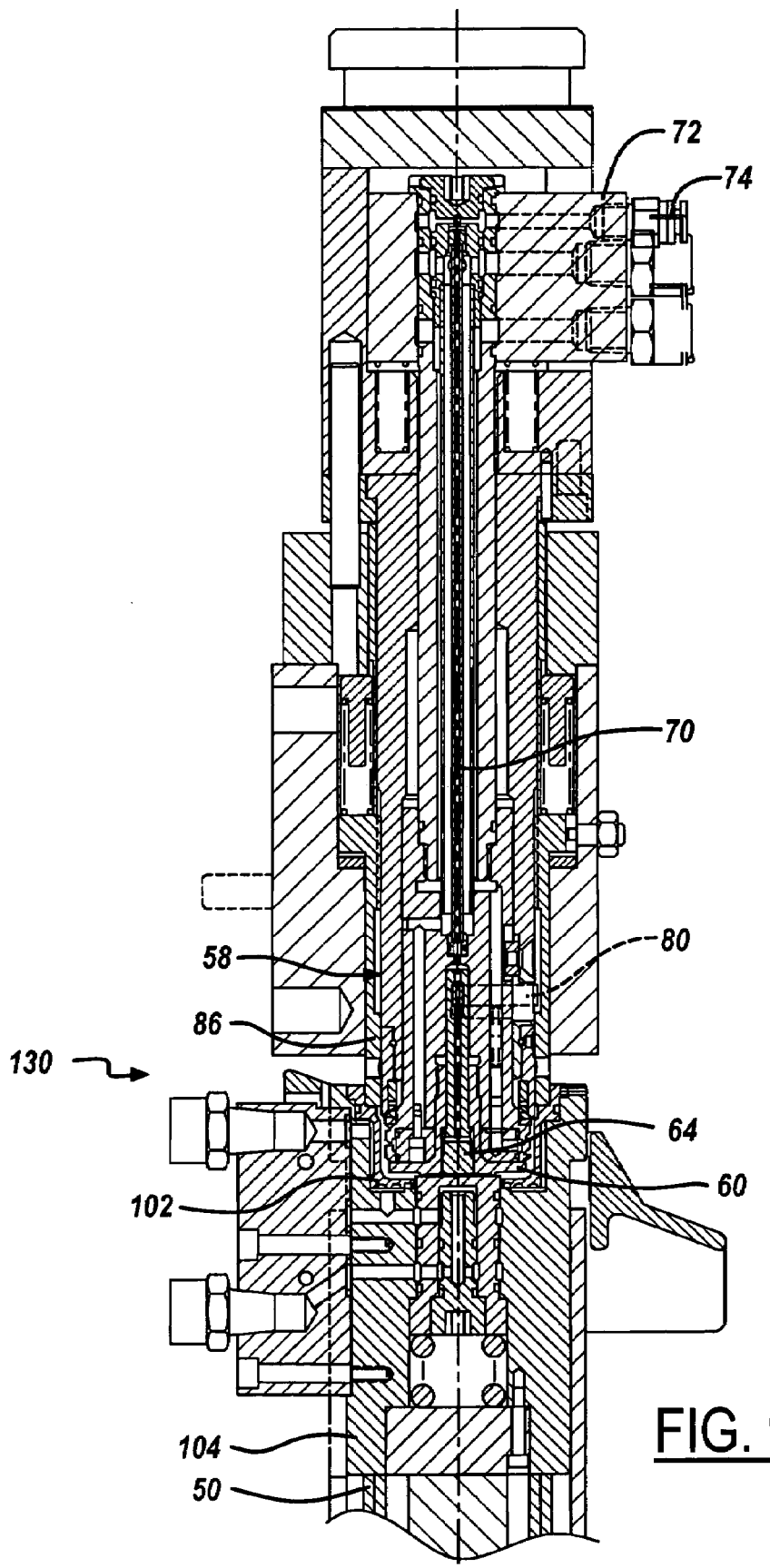
FIG. 9 is a fragmentary sectional view of a compression mold in accordance with yet another embodiment of the disclosure.

FIG. 9 illustrates a mold 130 that is similar to mold 120 of FIGS. 5-9, but additionally includes an air tube 70 coupled to fitting 74 on manifold block 72 for feeding compressed air through stripper punch 64 to assist stripping of the disk from the core tip, as previously described.

Figure 10:
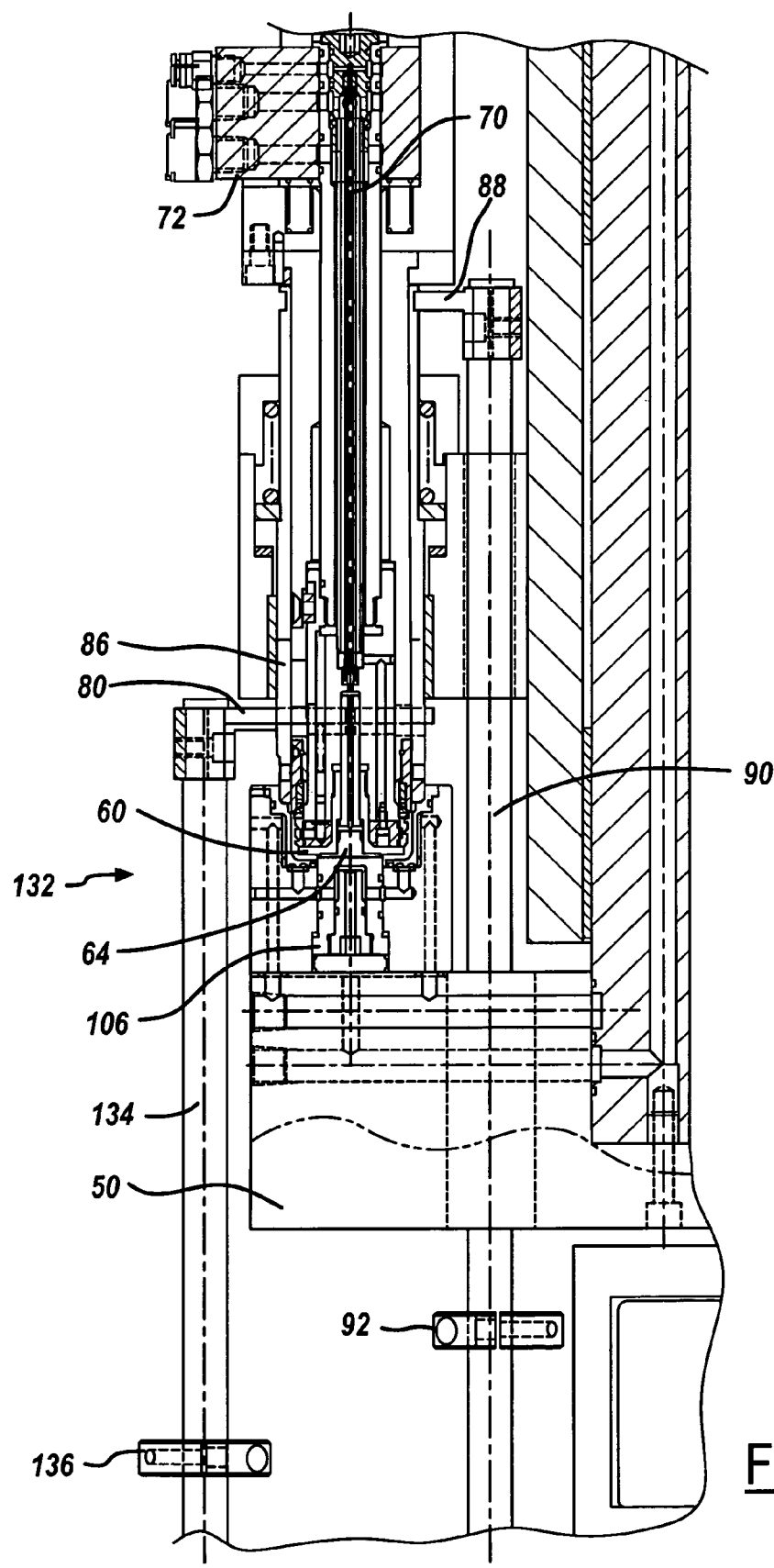
FIG. 10 is a fragmentary sectional view of a further embodiment of the present disclosure.

FIG. 10 illustrates a mold 132 that is similar to mold 52 in FIGS. 3A-5, except that the stripper sleeve 86 and the stripper punch 64 are actuated independently of each other. That is, stripper sleeve 86 is operatively coupled by collar 88, rod 90 and collar 92 to crossbar 50 as in the prior embodiment. However, in the embodiment of FIG. 10 key 80 is not coupled to a slot in stripper sleeve 86 is in the prior embodiments, but rather is operatively coupled by a rod 134 and a collar 136 to the crossbar 50. Collars 92,136 preferably are independently adjustably positioned on the respective rods 90,134 to stagger operation of stripper sleeve 86 and stripper punch 64. Thus, stripper sleeve 86 may be operated either prior to or subsequent to stripper punch 64 so as to strip the closure shell from the mold core either prior to or subsequent to stripping of the disk from the mold core.

Figure 11:
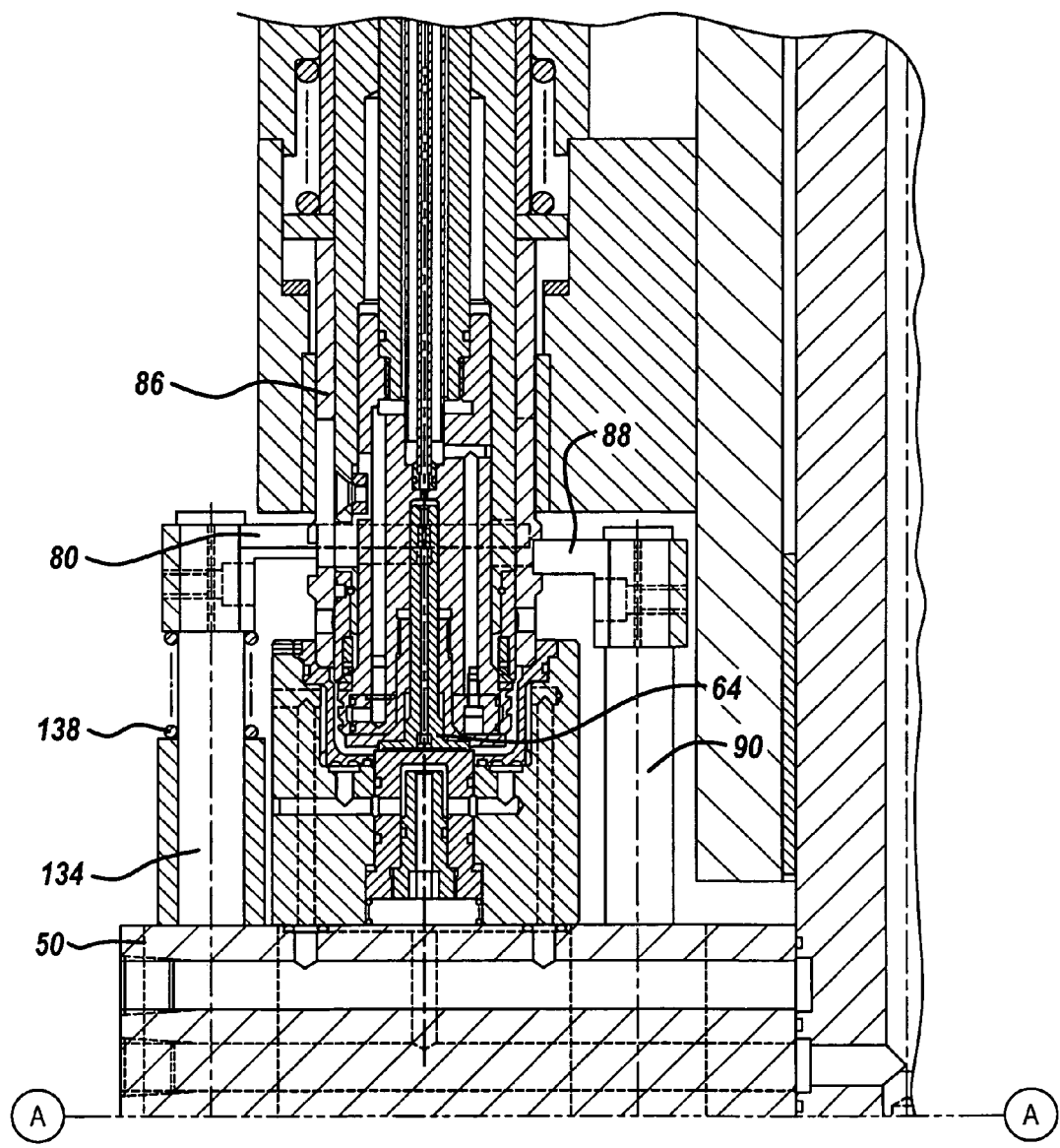
FIG. 11 is a fragmentary sectional view of another embodiment of the present disclosure.

FIG. 11 illustrates a modification to FIG. 10, in which the collar 88 coupled to rod 90 is positioned closer to the tip of stripper sleeve 86, and in which a coil spring 138 is captured in compression surrounding rod 134 between key 80 and crossbar 50 so as to bias stripper punch 64 to the seated position.

There thus have been disclosed a method and machine for compression molding plastic closures that include an opening in the base wall of the closure shell, which fully satisfy all of the objects and aims previously set forth. The subject matter has been disclosed in conjunction with several presently preferred embodiments, and a number of additional modifications and variations have been described. Other modifications and variations readily will suggest themselves to persons of ordinary skill in the art in view of the foregoing description. For example, although mounting of the molds on a vertical wheel rotatable around a horizontal axis is presently preferred, the invention could as readily be implemented in a horizontal wheel or carousal-type machine that rotates around a vertical axis, and in which the molds are aligned along axes parallel to the axis of rotation. Likewise, although the subject matter has been disclosed in conjunction with operation of the stripper sleeve and stripper punch by motion of the opposing mold section, it will be recognized that the stripper sleeve and stripper punch could as readily be operated by one or more cams disposed adjacent to the wheel to open and close the mold sections and operate the stripper sleeve and punch as a function of rotation of the wheel around either a vertical or a horizontal axis. Use of an internal annular pocket for slot 84 in stripper sleeve 86 also permits rotation of the stripper sleeve with respect to the core to unthread the closure from the core, as illustrated for example in U.S. Pat. No. 6,706,231 The present invention is intended to embrace these and all other alternatives and modifications as fall within the spirit and broad scope of the appended claims.

The invention claimed is:
1. A machine for compression molding a closure shell having a base wall with an opening, which includes:
   a male mold section and a female mold section, said male and female mold sections having associated surfaces that oppose each other to form a cavity for compression molding the base wall, an annular bead on one of said surfaces for cooperating with the opposing other surface to compression mold a disk connected to the base wall by a thin frangible web, and means for separately stripping the disk and the shell from said mold so that said shell emerges from said machine with the opening formed in said base wall by removal of said disk, wherein said male mold section includes a mold core, a stripper sleeve surrounding said core for stripping the shell from said core, a stripper punch within said core for stripping the disk from said core, and means for moving said stripper sleeve and said stripper punch separately from each other with respect to said core.

2. The machine set forth in claim 1 wherein said means includes a lost motion connection between said stripper sleeve and said stripper punch.

3. The machine set forth in claim 2 wherein said lost motion connection is such that motion of said stripper sleeve over said core strips the closure shell from said core before moving said punch to strip the disk from said core.

4. The machine set forth in claim 3 wherein said lost motion connection includes a slot in said stripper sleeve and a key that extends from said slot through said core to said punch, said slot being such as to allow motion of said stripper sleeve over said core to strip the shell from said core before engaging said key to move said punch within said core to strip the disk from said core.

5. The machine set forth in claim 1 wherein said means moves said stripper sleeve and said stripper punch independently of each other with respect to said core.

6. The machine set forth in claim 5 wherein at least one of said male and female mold sections is movable with respect to the other between an open position spaced from each other for removing the molded closure shell and placing a mold charge into said mold, and a closed position for compression molding the shell and disk.

7. The machine set forth in claim 6 wherein said means are such that said stripper sleeve moves before said stripper punch and the shell is stripped from said mold prior to the disk.

8. The machine set forth in claim 6 wherein said means are such that said stripper punch moves before said stripper sleeve and the disk is stripped from said mold core prior to the shell.

9. The machine set forth in claim 6 wherein said means operatively couple said stripper sleeve and said stripper punch to said female mold section such that motion of said at least one mold section moves said stripper sleeve and said stripper punch in sequence.

10. The machine set forth in claim 1 wherein said annular bead is disposed on said mold core.

11. The machine set forth in claim 10 wherein said annular bead includes an internal annular undercut to retain the disk on said core pending motion of said stripper punch.

12. The machine set forth in claim 10 wherein said female mold section includes a mold pin biased toward said mold core and having a surface opposed to said bead on said mold core.

13. The machine set forth in claim 1 wherein said mold core includes a passage for feeding air under pressure through said core and said stripper punch for air assistance in stripping the disk from said mold core.

14. The machine set forth in claim 1 including a plurality of said male and female mold sections in radially opposed angularly spaced pairs around a wheel mounted for rotation around an axis.

15. The machine set forth in claim 14 wherein said axis is a horizontal axis and said female mold section is mounted radially outwardly of said male mold section in each said pair around said wheel.

16. The machine set forth in claim 14 including a cam disposed adjacent to said wheel for engaging said molds in sequence during rotation of said wheel to move at least one of said mold sections with respect to the other between said open and closed positions.

17. A continuous motion compression molding machine for molding closure shells having a base wall with an opening, which includes:

a wheel mounted for rotation around an axis and a plurality of angularly spaced molds disposed around said wheel, each of said molds including a male mold section and a female mold section aligned with each other and having associated surfaces that oppose each other to form a cavity for compression molding the shell base wall, each of said male mold sections including a mold core having an end face, an annular bead on said end face, a stripper sleeve surrounding said core and a stripper punch within said core, and a cam disposed adjacent to said wheel to engage said molds and move at least one of said mold sections of each said mold in sequence between an open position for stripping molded shells from said cores and placing mold charges into said molds, and a closed position for compression molding the mold charges, said male and female mold sections cooperating to compression mold a disk within said bead connected to the shell base wall by a thin frangible web, each of said male mold sections including means for moving said stripper sleeve and said stripper punch separately from each other with respect to said core to strip the shell and the disk separately from said core.

18. The machine set forth in claim 17 wherein said means includes a lost motion connection between said stripper sleeve and said stripper punch.

19. The machine set forth in claim 18 wherein said lost motion connection is such that motion of said stripper sleeve over said core strips the closure shell from said core before moving said punch to strip the disk from said core.

20. The machine set forth in claim 19 wherein said lost motion connection includes a slot in said stripper sleeve and a key that extends from said slot through said core to said punch, said slot being such as to allow motion of said stripper sleeve over said core to strip the shell from said core before engaging said key to move said punch within said core to strip the disk from said core.

21. The machine set forth in claim 17 wherein said means moves said stripper sleeve and said stripper punch independently of each other with respect to said core.

22. The machine set forth in claim 21 wherein at least one of said male and female mold sections is movable with respect to the other between an open position spaced from each other for removing the molded closure shell and placing a mold charge into said mold, and a closed position for compression molding the shell and disk.

23. The machine set forth in claim 22 wherein said means are such that said stripper sleeve moves before said stripper punch and the shell is stripped from said mold prior to the disk.

24. The machine set forth in claim 22 wherein said means are such that said stripper punch moves before said stripper sleeve and the disk is stripped from said mold core prior to the shell.

25. The machine set forth in claim 22 wherein said means operatively couple said stripper sleeve and said stripper punch to said female mold section such that motion of said at least one mold section moves said stripper sleeve and said stripper punch in sequence.

26. The machine set forth in claim 17 wherein said annular bead includes an internal annular undercut to retain said disk on said core pending motion of said stripper plug.

27. The machine set forth in claim 17 wherein said female mold section includes a mold pin biased toward said mold core and having a surface opposed to said bead on said mold core.

28. The machine set forth in claim 17 wherein said wheel is mounted for rotation around a horizontal axis.

29. The machine set forth in claim 28 wherein said female mold section is mounted radially outwardly of said male mold section in each said mold.

30. A machine for molding a closure shell having a base wall with an opening, which includes:

a female mold section and a male mold section, said male and female mold sections having associated surfaces that oppose each other to form a cavity for molding the closure shell base wall, said male mold section including a mold core having an end forming said surface on said male mold section and a bead on said surface for cooperating with the opposing surface of said female mold section to mold a disk connected to said base wall by a thin frangible web, and means on said male mold section for separately stripping the disk and the shell from said mold core so that the shell emerges from said machine with the disk removed and the opening formed in the base wall.

31. The machine set forth in claim 30 wherein said female mold section includes a mold pin biased toward said mold core and having a surface opposed to said bead on said mold core.

32. The machine set forth in claim 30 wherein said means on said male mold section includes a stripper punch within said core, a stripper sleeve surrounding said core, and means for moving said stripper punch and said stripper sleeve separately from each other.

33. The machine set forth in claim 32 wherein said stripper punch is coupled to said stripper sleeve by a lost motion coupling.

34. The machine set forth in claim 32 wherein said stripper punch and said stripper sleeve move independently of each other.

35. The machine set forth in claim 32 wherein said bead includes an undercut for retaining the disk on said core.

36. The machine set forth in claim 32 including means for feeding air through said mold core and through said stripper punch to assist stripping of the disk from the mold core.

\* \* \* \* \*